I. YOST.
Gate.
No. 196,735. Patented Oct. 30, 1877.
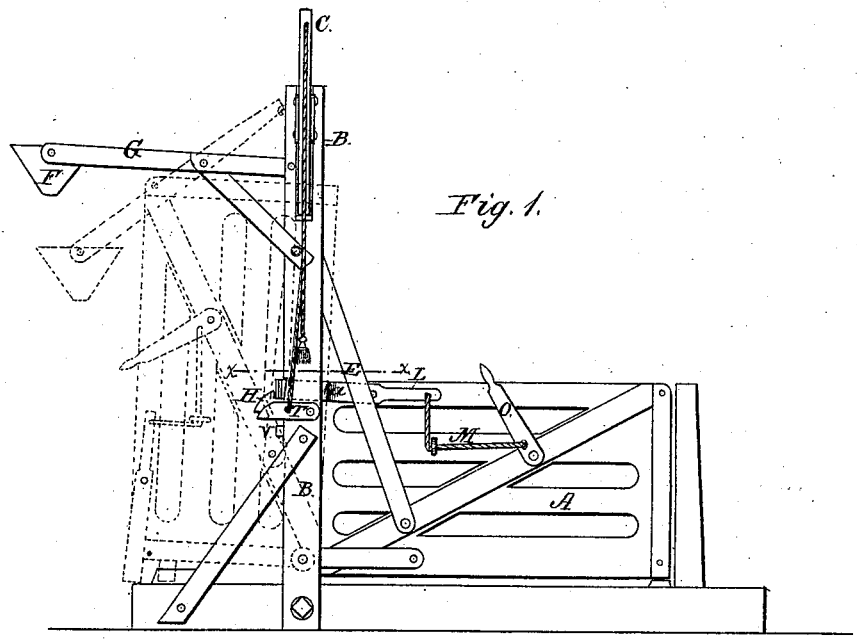
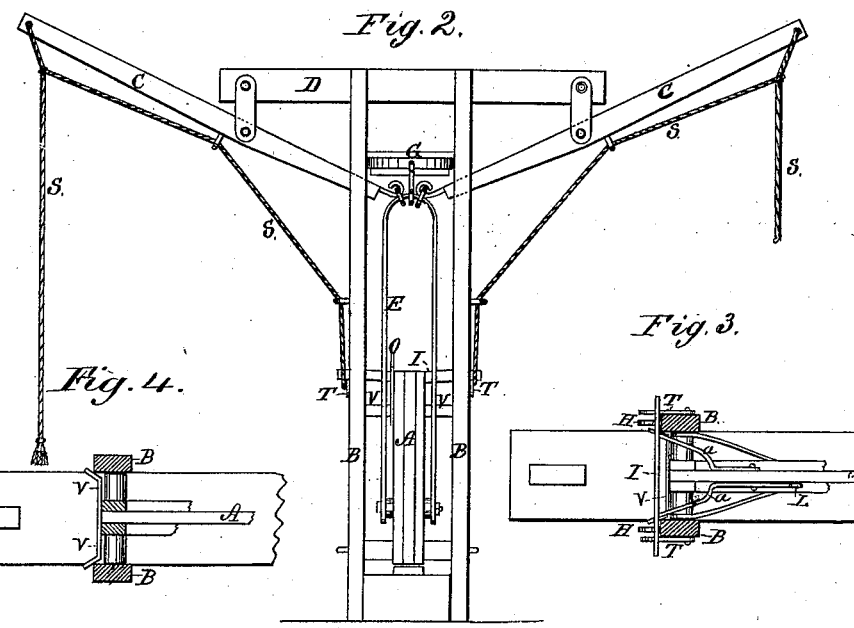

UNITED STATES PATENT OFFICE.

IRVIN YOST, OF THORNVILLE, OHIO.

IMPROVEMENT IN GATES.

Specification forming part of Letters Patent No. 196,735, dated October 30, 1877; application filed September 27, 1877.

*To all whom it may concern:*

Be it known that I, IRVIN YOST, of Thornville, in the county of Perry and State of Ohio, have invented a new and Improved Gate; and I do hereby declare that the following is a full, clear, and exact description of the same.

My invention relates to an improvement in that class of farm-gates which are pivoted in such manner as to swing in a vertical plane, and thus avoid obstruction by snow and ice, and also admit of easy operation by means of levers extending either way from the gate at right angles thereto.

The invention particularly relates to the construction and arrangement of the devices for counterbalancing and operating the gate, as hereinafter described and claimed.

In the accompanying drawings, forming part of this specification, Figure 1 is a side elevation; Fig. 2, an end elevation of my improved gate, and Fig. 3 a detail cross-section on line $x$ $x$ of Fig. 1. Fig. 4 is a detail view.

The gate A is pivoted at its rear lower corner between two vertical parallel posts, B, and is caused to swing in a vertical plane between said posts by means of levers C C, which are pivoted to a cross-beam, D, extending from the posts in a direction at right angles to the gate, and are connected with the latter by a pivoted stirrup, E. The gate is nearly balanced by weights placed in a box, F, which is pivoted between the outer ends of parallel bars or levers G G, fulcrumed in suitable arms or brackets of the posts B B, and attached at their inner ends to the said stirrup E. The bars G G are placed at such distance apart as to allow the gate to enter or pass between them when the gate is tilted, as shown in dotted lines. The stirrup E being pivoted to the gate on each side, and the bars G connected with the stirrup, as shown, the pivots of the gate are not subjected to strain unequally. The stirrup is also pivoted to the gate at such a point that the greatest effect of the counterbalance is produced when the gate is horizontal, and the least when it is vertical. Thus the gate may be raised easily, but is prevented from moving too rapidly just as it is completing its movement either in opening or closing.

The latch or locking devices consist of catches H, attached to the posts B, and a bar, I, which is arranged at right angles, and pivoted to the rear upper corner of the gate by means of arms $a$, which extend along the sides of latter. The said bar I thus acts as a latch, which, when the gate swings shut, simultaneously engages the fixed beveled catches H, and prevents the gate being again opened until the latch is raised, which is effected as follows: The pivot-arms of the latch-bar I have a forward extension, L, which is connected by a cord, M, with a hand-lever, O, pivoted to the gate about midway of its length.

By this arrangement, when the hand-lever O is operated, the lever $a$ L will be tilted, and the latch-bar I raised and disengaged from the catches.

The hand-lever O is for the use of persons on foot desiring to pass through the gateway. For use of those in carriages or on horseback, I employ levers C, hand-ropes S, and pivoted levers T, having beveled ends. By pulling one of the ropes S, the latch I will be released, and a lever, C, tilted, thus raising the gate.

A bar, V, is attached to the rear upper corners of the gate crosswise thereof, and its ends are bent backward at a slight angle, Fig. 3, to enable them to stay or steady the upper portion of the gate, and hold it firmly by contact with the posts B B when the gate is closed.

I do not claim, broadly, a vertically-tilting gate having a latch-bar attached to it in such manner as to engage catches fixed to the pivot-posts when the gate swings shut; but

What I claim is—

In combination with the vertically-swinging gate and posts B B, the stirrup E, pivoted to the gate on each side thereof, the parallel counterbalance-levers G, connected to said stirrup, all as shown and described.

The above specification of my invention signed by me this 20th day of September, 1877.

IRVIN YOST.

Witnesses:
AMOS W. HART,
CHAS. A. PETTIT.